US011200685B2

(12) United States Patent
Kong et al.

(10) Patent No.: US 11,200,685 B2
(45) Date of Patent: Dec. 14, 2021

(54) METHOD FOR THREE-DIMENSIONAL HUMAN POSE ESTIMATION

(71) Applicant: Beijing University of Technology, Beijing (CN)

(72) Inventors: Dehui Kong, Beijing (CN); Yongpeng Wu, Beijing (CN); Shaofan Wang, Beijing (CN); Jinghua Li, Beijing (CN); Lichun Wang, Beijing (CN)

(73) Assignee: Beijing University of Technology, Beijing (CN)

( * ) Notice: Subject to any disclaimer, the term of this patent is extended or adjusted under 35 U.S.C. 154(b) by 92 days.

(21) Appl. No.: 16/724,608

(22) Filed: Dec. 23, 2019

(65) Prior Publication Data

US 2020/0302621 A1 Sep. 24, 2020

(30) Foreign Application Priority Data

Mar. 18, 2019 (CN) .......................... 201910201559.3

(51) Int. Cl.
*G06T 7/246* (2017.01)
*G06T 7/215* (2017.01)
(Continued)

(52) U.S. Cl.
CPC .............. *G06T 7/251* (2017.01); *G06T 7/215* (2017.01); *G06T 7/75* (2017.01); *G06T 7/97* (2017.01);
(Continued)

(58) Field of Classification Search
CPC G06T 7/215; G06T 7/251; G06T 7/75; G06T 7/97; G06T 17/00; G06T 17/005;
(Continued)

(56) References Cited

U.S. PATENT DOCUMENTS 7,257,237 B1 * 8/2007 Luck ..................... A61B 5/1113
382/103
2010/0215271 A1 * 8/2010 Dariush ............... G06K 9/4671
382/180

(Continued)

OTHER PUBLICATIONS

Wu, Yongpeng, et al. "An unsupervised real-time framework of human pose tracking from range image sequences." IEEE Transactions on Multimedia 22.8 (Nov. 2019): 2177-2190 (Year: 2019).*

(Continued)

*Primary Examiner* — Matthew Salvucci
(74) *Attorney, Agent, or Firm* — Bayramoglu Law Offices LLC

(57) ABSTRACT

The invention discloses a method for three-dimensional human pose estimation, which can realize the real-time and high-precision 3D human pose estimation without high configuration hardware support and precise human body model. In this method for three-dimensional human pose estimation, including the following steps: (1) establishing a three-dimensional human body model matching the object, which is a cloud point human body model of visible spherical distribution constraint. (2) Matching and optimizing between human body model for human body pose tracking and depth point cloud. (3) Recovering for pose tracking error based on dynamic database retrieval.

7 Claims, 5 Drawing Sheets

(51) Int. Cl.
| | |
|---|---|
| *G06T 7/73* | (2017.01) |
| *G06T 19/00* | (2011.01) |
| *G06T 17/00* | (2006.01) |
| *G06T 7/00* | (2017.01) |
| *G06T 17/20* | (2006.01) |
| *G06T 19/20* | (2011.01) |

(52) U.S. Cl.
CPC ............ *G06T 17/00* (2013.01); *G06T 17/005* (2013.01); *G06T 17/20* (2013.01); *G06T 19/003* (2013.01); *G06T 19/20* (2013.01); *G06T 2200/04* (2013.01); *G06T 2200/08* (2013.01); *G06T 2207/10028* (2013.01); *G06T 2207/30196* (2013.01)

(58) Field of Classification Search
CPC ....... G06T 17/20; G06T 19/003; G06T 19/20; G06T 2200/04; G06T 2200/08; G06T 2207/10028; G06T 2207/30196
USPC .......................................................... 345/419
See application file for complete search history.

(56) References Cited

U.S. PATENT DOCUMENTS

| | | | | |
|---|---|---|---|---|
| 2014/0355825 | A1* | 12/2014 | Kim | G06K 9/00369 382/103 |
| 2015/0139505 | A1* | 5/2015 | Vladimirov | G06T 7/246 382/107 |
| 2016/0335790 | A1* | 11/2016 | Fleishman | G06T 17/10 |
| 2019/0272670 | A1* | 9/2019 | Tagliasacchi | G06K 9/00355 |

OTHER PUBLICATIONS

Baak et al. "A Data-Driven Approach for Real-Time Full Body Pose Reconstruction from a Depth Camera" Saarland University & MPI Informatik, Saarbrucken, Germany. 2011 IEEE International Conference on Computer Vision, pp. 1092-1099.
Ye et al. "Accurate 3D Pose Estimation From a Single Depth Image" University of Kentucky, HP Labs, Palo Alto, Bosch Research, ETH Zurich, 2011, 8 pages, pp. 731-738.
Wei et al. 2012. Accurate Realtime Full-body Motion Capture Using a Single Depth Camera. ACM Trans. Graph. 31 6, Article 188, Texas A&M University, Nov. 2012, pp. 188:1-188:12.
Ding et al. "Articulated Gaussian Kernel Correlation for Human Pose Estimation" IEEE International Conference on Computer Vision, Stillwater, OK, USA 74074, 2015, pp. 57-64.
Tanner Schmidt et al. "DART: Dense Articulated Real-Time Tracking" Robotics: Science and Systems. vol. 2. No. 1. 2014, University of Washington, Seattle, Washington, pp. 1-9.
Pons-Moll et al. "Metric Regression Forests for Correspondence Estimation" Int J Comput Vis, Springer Science+Business Media New York 2015, pp. 1-13.
Helten et al., H.-P & Theobalt, Christian. (2013). Personalization and Evaluation of a Real-Time Depth-Based Full Body Tracker. Proceedings—2013 International Conference on 3D Vision, Saarbrucken, Germany, 3DV 2013. 279-286. 10.1109/3DV.2013.44.
Vasileiadis et al. "Robust Human Pose Tracking For Realistic Service Robot Applications" 2017 IEEE International Conference on Computer Vision Workshops (ICCVW), Venice, 2017, pp. 1363-1372.
Dragomir Anguelov et al. "SCAPE: Shape Completion and Animation of People" ACM transactions on graphics (TOG), vol. 24, No. 3, University of California, Santa Cruz, 2005, 9 page, pp. 408-416.
Ganapathi et al.. (2010). Real Time Motion Capture Using a Single Time-Of-Flight Camera Proceedings of the IEEE Computer Society Conference on Computer Vision and Pattern Recognition. Stanford University, Computer Science Department, Stanford, CA. 755-762.
Helten et al. (2013). Real-Time Body Tracking with One Depth Camera and Inertial Sensors. Proceedings of the IEEE International Conference on Computer Vision. Saarland University and MPI Informatik, pp. 1105-1112.
Shotton et al. Real-Time Human Pose Recognition in Parts from Single Depth Images. 2011. Communications of the ACM. 56. Microsoft Research Cambridge. pp. 1297-1304.
Ganapathi et al. (2012). Real-Time Human Pose Tracking from Range Data. Lecture Notes in Computer Science. 7577. Stanford, CA, USA. pp. 738-751.
Ye et al. "Real-Time Simultaneous Pose and Shape Estimation for Articulated Objects Using a Single Depth Camera" IEEE Transactions on Pattern Analysis and Machine Intelligence vol. 38, No. 8, Aug. 2016, pp. 1517-1532.
Qian et al. "Realtime and Robust Hand Tracking from Depth" (2014). Realtime and Robust Hand Tracking from Depth. Microsoft Research. 1106-1113.

\* cited by examiner

METHOD FOR THREE-DIMENSIONAL HUMAN POSE ESTIMATION

CROSS REFERENCE TO THE RELATED APPLICATIONS

This application is based upon and claims priority to Chinese Patent Application No. CN 201910201559.3, filed on Mar. 18, 2019, the entire contents of which are incorporated herein by reference.

TECHNICAL FIELD

The present invention relates to the technical field of computer vision and pattern recognition, and particularly to a method for three-dimensional human pose estimation.

BACKGROUND OF THE INVENTION

Three-dimensional (3D) human pose estimation based on computer vision technology has been widely used in many fields of human life, such as computer animation, medicine, human-computer interaction and so on. With the introduction of low-cost RGB-D sensors (such as Kinect), compared with RGB visual information, depth image can greatly avoid data defects caused by complex background and changes in light conditions. Therefore, the performance of 3D human pose estimation is improved obviously by using the depth information, which has become the current research hotspot. At present, many methods of 3D human pose estimation based on depth data have achieved better recognition results, but the further improvement of recognition accuracy still needs to overcome two inherent serious defects of depth data acquired by sensors: noise and occlusion.

There are two kinds of methods for 3D human pose estimation based on depth information: discriminant method and generating method. The former relies on a large number of training data, and therefore can adapt to the changes of different body types, but most of them can not get higher precision in the case of complex motion; the latter usually depends on complex and accurate human body model, and therefore can get high precision in the case of data loss, but in the case of fast and complex motion, it is easy to fall into local optimization and lose the global optimum solution. It can be seen that the implementation of high-performance 3D human pose estimation methods often depends on the following points: 1) a large number of accurate training data sets; 2) a huge pose database for tracking error recovery; 3) GPU acceleration support; 4) accurate 3D human model. These limitations limit the application of real-time human-computer interaction on the platform of general hardware configuration.

SUMMARY

The technical problem addressed by the present invention is to overcome the deficiency in the prior art, and to provide a method for three-dimensional human pose estimation, which can realize the real-time and high-precision 3D human pose estimation without high configuration hardware support and precise human body model.

The technical solution of the present invention is that, in this method for three-dimensional human pose estimation, including the following steps:
(4) establishing a three-dimensional human body model matching the object, which is a cloud point human body model of visible spherical distribution constraint.
(5) Matching and optimizing between human body model for human body pose tracking and depth point cloud.
(6) Recovering for pose tracking error based on dynamic database retrieval.

The invention takes the depth map sequence as the input, optimizes and matches with the established 3D human body model and the 3D point cloud transformed from the depth map. The optimization process combines the global translation transformation and the local rotation transformation, and uses the dynamic database to recover the pose when the tracking error occurs, finally realizes the fast and accurate pose tracking, and obtains the estimated position of the joint points from the human body model. So the real-time and high-precision three-dimensional human pose estimation can be realized without high configuration hardware support and accurate human body model.

BRIEF DESCRIPTION OF THE DRAWINGS

FIG. 1A shows the ball set represents the human body model and the division of parts, and FIG. 1B shows the surface sampling of the ball set.

FIG. 2A shows 11 parts division and naming, and FIG. 2B shows parts of parent node division.

DETAILED DESCRIPTION OF THE EMBODIMENTS

Figure 8:
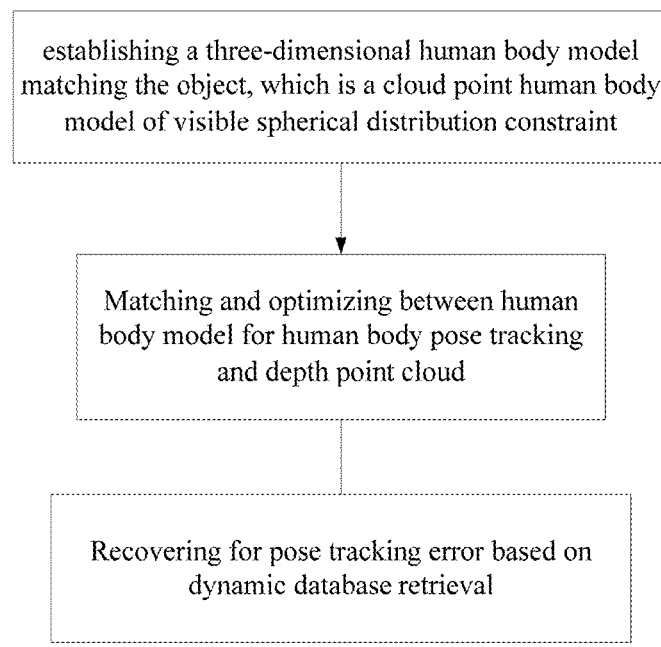
FIG. 8 shows a flow chart of the three-dimensional human pose estimation method according to the present invention.

As shown as FIG. 8, in this method for three-dimensional human pose estimation, including the following steps:
(4) establishing a three-dimensional human body model matching the object, which is a cloud point human body model of visible spherical distribution constraint,
(5) Matching and optimizing between human body model for human body pose tracking and depth point cloud.
(6) Recovering for pose tracking error based on dynamic database retrieval.

The invention takes the depth map sequence as the input, optimizes and matches with the established 3D human body model and the 3D point cloud transformed from the depth map. The optimization process combines the global translation transformation and the local rotation transformation, and uses the dynamic database to recover the pose when the tracking error occurs, finally realizes the fast and accurate pose tracking, and obtains the estimated position of the joint points from the human body model. So the real-time and high-precision three-dimensional human pose estimation can be realized without high configuration hardware support and accurate human body model.

Preferably, in step (1):

Representation of human body surface with 57 spherical sets. Each sphere is characterized by a radium and a center, which are initialized empirically. By corresponding all the spheres to 11 body components, the sphere set S is defined to be the collection of 11 component sphere set models, each of which represents a body component. That is, $$S = \bigcup_{k=1}^{11} S^k \tag{1}$$

$$S^k = \{g_i^k\}_{i=1}^{N_k} := \{[c_i^k, r_i^k]\}_{i=1}^{N_k}$$

Where $c_i^k$, $r_i^k$ represent the center, the radius of the ith sphere in the kth component, respectively, and $N_k$ represents the number of spheres contained in the kth component, with $$\sum_{k=1}^{11} N_k = 57.$$

Preferably, in step (1), ignore wrist and ankle movements.

Preferably, in step (1), for all 57 spheres, a directed tree is constructed, each node of which corresponds to a sphere. The root of the tree is $g_1^1$, and each of the other nodes has a unique parent node which is denoted by a black sphere. The definition of the parent nodes is given by:

$$\text{parent}(S^1)=g_1^1, \text{parent}(S^2)=g_1^1, \text{parent}(S^3)=g_2^2, \text{parent}(S^4)=g_1^3, \text{parent}(S^5)=g_1^2, \text{parent}(S^6)=g_1^5, \text{parent}(S^7)=g_2^2, \text{parent}(S^8)=g_3^1, \text{parent}(S^9)=g_1^8, \text{parent}(S^{10})=g_2^1, \text{parent}(S^{11})=g_1^{10} \tag{2}$$

Based on this definition, the motion of each body part is considered to be determined by the rotation motion $R_k$ in the local coordinate system with its parent node as the origin plus the global translation vector t in the world coordinate system. Using Fibonacci spherical algorithm to get spherical point cloud by dense sampling, a cloud point human body model of visible spherical distribution constraint is described in the formula (3):

$$\mathcal{V} = \bigcup_{k=1}^{11} \mathcal{V}^k := \bigcup_{k=1}^{11} \bigcup_{i=1}^{N_k} \bigcup_{j=1}^{Q_{k,i}} \{c_i^k + r_i^k d_{k,i}^j\} \tag{3}$$

$$d_{k,i}^j = [x_{k,i}^j, y_{k,i}^j, z_{k,i}^j]^T$$

$$x_{k,i}^j = \sqrt{1 - (z_{k,i}^j)^2} \cdot \cos(2\pi j \phi)$$

$$y_{k,i}^j = \sqrt{1 - (z_{k,i}^j)^2} \cdot \sin(2\pi j \phi)$$

$$z_{k,i}^j = (2j-1)/N_i - 1;$$

wherein $Q_{k,i}$ denotes the number of sampling points of the ith sphere of the kth component, and $\phi \approx 0.618$ is the golden section ratio. For example, $d_{k,i}^j$ denotes the direction vector of the jth sampling point of the ith sphere of the kth component. Therefore, each point is assigned a visibility attribute, which is determined by the observation coordinate system of the point cloud, and whether each point is visible through visibility detection. A point set consisting of all spherical visible points is used to represent the cloud point human body model of visible spherical distribution constraint.

Preferably, in step (2), the depth point cloud P transformed from the depth map is sampled to obtain $\overline{P}$. Assuming that both the model and the depth point cloud are in the same camera coordinate system, The camera corresponding to the depth point cloud is used to constrain the angle of view, and the intersecting part and the occluding part are removed to retain the visible points $\nabla$ on the model under the current angle of view. These points represent the model in the current pose. Using Euclidean distance measure to get $\overline{P}$ the corresponding point $\overline{\nabla}$ on $\nabla$, redefining $\overline{\nabla}$:

$$\overline{\mathcal{V}} = \bigcup_{k=1}^{11} \bigcup_{i=1}^{N_k} \bigcup_{j=1}^{\overline{Q}_{k,i}} \{c_i^k + r_i^k d_{k,i}^j\} \tag{4}$$

$$\overline{\mathcal{P}} = \bigcup_{k=1}^{11} \bigcup_{i=1}^{N_k} \bigcup_{j=1}^{\overline{Q}_{k,i}} \overline{p}_{k,i}^j.$$

Preferably, in step (2),

After the correspondence between $\overline{P}$ and $\overline{\nabla}$ is established, the movement of human body is represented as a series of simultaneous and slow movements of all body component. Therefore, the matching and optimization of the model and point cloud convert a global translation t and a series of local rotation. Cost function is formula (5):

$$\min_{R_k, t} \sum_{k=1}^{11} (\lambda \Psi_{corr}(R_k, t) + \Psi_{joint}(R_k, t) + \mu_k \Psi_{regn}(R_k)) \tag{5}$$

$$\text{s.t.} (R_k)^\top R_k = I$$

Where $\lambda$, $\mu_k > 0$ and are weight parameters, the first term $\Psi_{core}$ penalizes the distance between model surface point and input depth point cloud, $$\Psi_{corr}(R_k, t) = \sum_{i=1}^{N_k} \sum_{j=1}^{\overline{Q}_{k,i}} \underbrace{\|c_{parent}^k + R_k(c_i^k - c_{parent}^k + r_{k,i} d_{k,i}^j) + t - \overline{p}_{k,i}^j\|^2}_{\text{point of VHM after rotation and translation}}$$

Where $c_{parent}^k$ represents the center coordinate of the parent node of kth component, and VIM represents the visible hybrid model, which is composed of the spherical set of components as shown in formula 1 and the cloud point human body model of visible spherical distribution constraint as shown in formula 3. Based on this constraint, each point of the model is enforced to locate closer to the corresponding point cloud after rotation and translation.

The second term $\Psi_{joint}$ is formula (6), using the joint position information and position direction information of the previous frame, it is used as a special marker information to restrict the excessive space movement and position rotation between the two frames, and to reduce the difference between the two frames to a certain extent $$\Psi_{joint}(R_k, t) = \sum_{m=1}^{M_k} (\alpha_{k,m} \|j_{k,m} + t - j_{k,m}^{init}\|^2 + \beta_{k,m} \|R_k n_{k,m} - n_{k,m}^{init}\|^2) \tag{6}$$

Where $j_{k,m}$, $j_{k,m}^{init}$ represent the position of the mth joint of the kth component under current pose and initial pose, respectively. $n_{k,m}$, $n_{k,m}^{init}$ represent the position of the mth joint and its parent joint under current pose and initial pose, respectively. The weight $\alpha_{k,m}$, $\beta_{k,m}$ for balancing the correspondence term and location is formula (7):

$$a_{k,m} = \frac{\tau^k}{1+e^{-(\|j_{k,m}-j_{k,m}^{init}\|-\omega_2)}} \quad (7)$$

$$\beta_{k,m} = \frac{\gamma^k}{1+e^{-(arccos(n_{k,m}^T r_{k,m}^{init})-\omega_3)}}$$

Where $\omega_7$, $\omega_3 > 0$, and are weight parameters for controlling the range of error. $\tau^k$, $\gamma^k$ are scaling parameters which defined by $$\tau^k = \frac{\mu_1}{1+e^{(Dist(\overline{P}^k,\overline{V}^k)-\omega_1)}} \quad (8)$$

$$\gamma^k = \frac{\mu_2}{1+e^{(Dist(\overline{P}^k,\overline{V}^k)-\omega_1)}}$$

$$Dist(\overline{P}^k,\overline{V}^k) = \frac{1}{|\overline{P}^k|}\sum_{k=1}^{11}\sum_{i=1}^{N_k}\sum_{j=1}^{Q_{k,i}}\|c_i^k+r_i^k d_{k,i}^j - \overline{p}_{k,i}^j\|$$

Where $Dist(\overline{P}^k,\overline{V}^k)$ represents the average distance between corresponding points of $\overline{P}^k$, $\overline{V}^k$. $\omega_1 > 0$ is used to determine the distance error threshold. $\tau^k$, $\gamma^k$ are only solved before optimization and after the first corresponding relationship is determined, and remains unchanged in the iterative process. $\alpha_{k,m}$, $\beta_{k,m}$ update when updating correspondence.

The third term $\Psi_{regu}$ is formula (9). The large rotation of each part in the iterative process is constrained. The motion between two adjacent frames is regarded as the process of simultaneous change of each part $$\Psi_{regu}(R_k) = \|R_k - I\|^2 \quad (9).$$

Preferably, in step (3),

Using the overlap rate $\theta_{overlap}$ and cost function value $\theta_{cost}$ of the input depth point cloud and the constructed human body model on the two-dimensional plane to determine whether the current tracking fails. Assuming that human limb motion segments have the repetitive characteristics in time series, the direction information of each body part is used to represent human three-dimensional motion, the upper and lower trunk parts are simplified into two mutually perpendicular main directions, each part of the limbs is represented by a direction vector, and the direction of the head is ignored, which is expressed as a formula (10)

$$v = (v_1^\tau, \ldots, v_{10}^\tau)^\tau \quad (10)$$

Where $v_1$, $v_2$ correspond to the pairwise perpendicular unit directions of upper torso, lower torso, respectively, and $v_3, \ldots, v_{10}$ correspond to the unit direction of all components except upper torso, lower torso, head.

Preferably, in step (3),

PCA is used to extract the main direction $[e_1, e_2, e_3]$ of the depth point cloud, and the minimum bounding box $[w,d,h]$ of the main direction is used to represent the characteristics of the depth point cloud, which is formula. (11)

$$e = (we_1^\tau, de_1^\tau, he_3^\tau)^\tau \quad (11)$$

If the cost function of matching is less than the threshold value in the tracking process $\theta_{overlap} \leq \theta_1$ and $\theta_{cost} \leq \theta_2$, the tracking is successful and update the database model D by extracting feature s $[e, v]$. The extracted characteristics $[e, v]$ are saved in database as a pair of characteristic vectors. When the tracking fails, the Euclidean distance is calculated by using the characteristics e of the corresponding depth point cloud in the database, the first five positions $\{[e^{(i)}, v^{(i)}]\}_{i=1}^{5}$ with the smallest distance are found in the database, and the position with the highest overlap rate with the current input depth point cloud is retrieved by using v(i), i=1, . . . , 5 to recover the visible spherical distribution constraint point cloud manikin, so as to facilitate the recovery from the tracking failure.

The invention is described in more detail below.

The invention takes the depth map sequence as the input, optimizes the matching between the established 3D human body model and the 3D point cloud transformed from the depth map. The optimization process combines the global translation transformation and the local rotation transformation, and uses the dynamic database to recover the pose when the tracking error occurs, finally realizes the fast and accurate pose tracking, and obtains the estimated joint position from the human body model. The invention mainly includes three key technical points: (1) establishing a three-dimensional human body model matching the object, which combines the advantages of geometric model and mesh model. (2) On the basis of the model, the matching optimization problem between the human body model and the point cloud is transformed into solving the global translation transformation matrix and the local rotation transformation matrix based on the determination of the corresponding relationship between the human body model and the depth point cloud. (3) Building a small dynamic database to track reinitialization in case of failure.

Figures 1A, 1B:
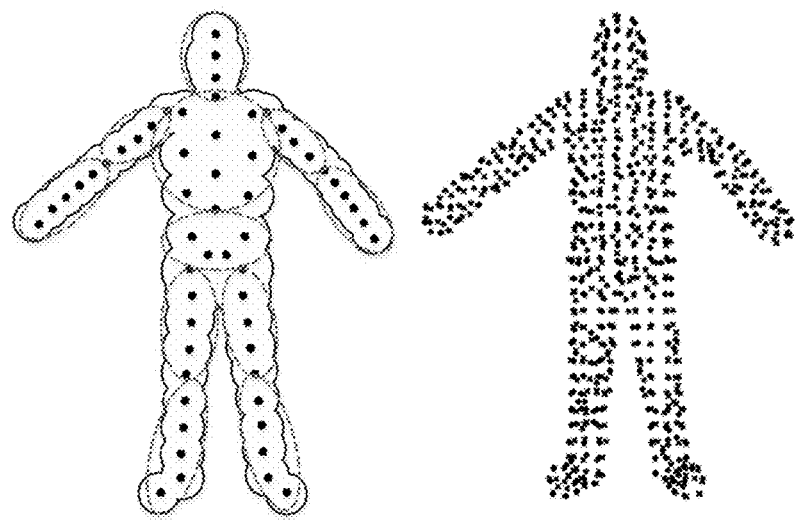
FIGS. 1A-B show that the ball set represents the human body model and the spherical point set represents the human body model.
Figures 2A, 2B:
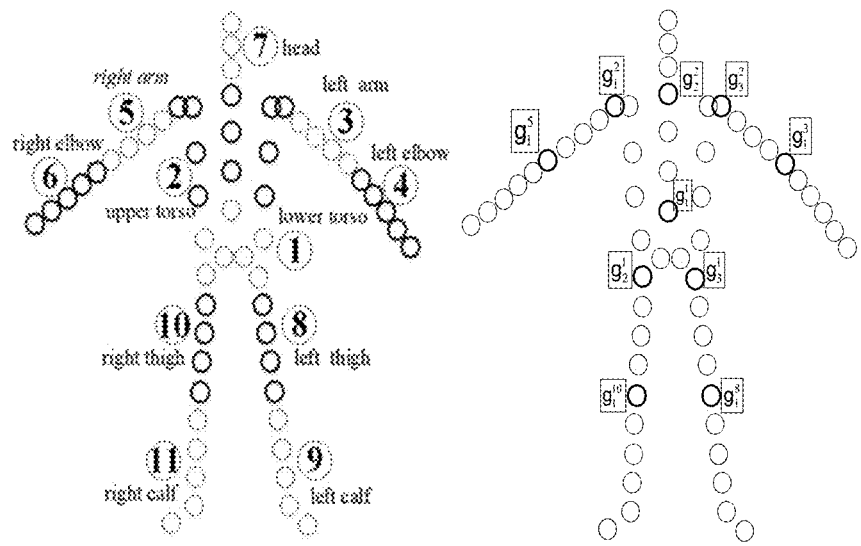
FIGS. 2A-B show 11 parts naming and parts of parent node division diagram of human body.

3. A cloud point human body model of visible spherical distribution constraint:

FIG. 1A shows a representation of human body surface with 57 spherical sets, each sphere is characterized by a radium and a center, which are initialized empirically. As shown in FIG. 2A, by corresponding all the spheres to 11 body components, the sphere set S is defined to be the collection of 11 component sphere set models, each of which represents a body component. That is, $$S = \bigcup_{k=1}^{11} S^k \quad (1)$$

$$S^k = \{g_i^k\}_{i=1}^{N_k} := \{[c_i^k, r_i^k]\}_{i=1}^{N_k}$$

Where $c_i^k$, $r_i^k$ represent the center, the radius of the ith sphere in the kth component, respectively, and $N_k$ represents the number of spheres contained in the kth component, with $$\sum_{k=1}^{11} N_k = 57.$$

For simplification, ignore wrist and ankle movements.

For all 57 spheres, constructing a directed tree, each node of which corresponds to a sphere, as shown as FIG. 2B. The root of the tree is $g_1^1$, and each of the other nodes has a unique parent node which is denoted by a black sphere. The definition of the parent nodes is given by:

$$\text{parent}(S^1)=g_1^1, \text{parent}(S^2)=g_1^1, \text{parent}(S^3)=g_3^2, \text{parent}(S^4)=g_1^3, \text{parent}(S^5)=g_1^2, \text{parent}(S^6)=g_1^5, \text{parent}(S^7)=g_2^2, \text{parent}(S^8)=g_3^1, \text{parent}(S^9)=g_1^8, \text{parent}(S^{10})=g_2^1, \text{parent}(S^{11})=g_1^{10} \quad (2)$$

Based on this definition, the motion of each body part is considered to be determined by the rotation motion $R_k$ in the local coordinate system with its parent node as the origin plus the global translation vector t in the world coordinate system, FIG. 1B shows the surface sampling of the ball set. Using Fibonacci spherical algorithm to get spherical point cloud by dense sampling, a cloud point human body model of visible spherical distribution constraint is the formula (3):

$$\mathcal{V} = \bigcup_{k=1}^{11} \mathcal{V}^k := \bigcup_{k=1}^{11} \bigcup_{i=1}^{N_k} \bigcup_{j=1}^{Q_{k,i}} \{c_i^k + r_i^k d_{k,i}^j\} \quad (3)$$

$$d_{k,i}^j = [x_{k,i}^j, y_{k,i}^j, z_{k,i}^j]^\top$$

$$x_{k,i}^j = \sqrt{1-(z_{k,i}^j)^2} \cdot \cos(2\pi j \phi)$$

$$y_{k,i}^j = \sqrt{1-(z_{k,i}^j)^2} \cdot \sin(2\pi j \phi)$$

$$z_{k,i}^j = (2j-1)/N_i - 1$$

Where $Q_{k,i}$ denotes the number of sampling points of the ith sphere of the kth component, and $\phi \approx 0.618$ is the golden section ratio. For example, $d_{k,i}^j$ denotes the direction vector of the jth sampling point of the ith sphere of the kth component. Therefore, each point is assigned a visibility attribute, which is determined by the observation coordinate system of the point cloud, and whether each point is visible through visibility detection. A point set consisting of all spherical visible points is used to represent the cloud point human body model of visible spherical distribution constraint. At this time, the model can not only control the shape of human body conveniently by changing the parameters of sphere definition, but also accurately represent the human body's pose by optimizing and matching with the input point cloud.

4. Matching and optimizing between human body model for human body pose tracking and depth point cloud:

The depth point cloud P transformed from the depth map is sampled to obtain $\overline{P}$. Assuming that both the model in step (1) and the depth point cloud are in the same camera coordinate system, the camera corresponding to the depth point cloud is used to constrain the angle of view, and the intersecting part and the occluding part are removed to retain the visible points $\nabla$ on the model under the current angle of view. These points represent the model in the current pose. Using Euclidean distance measure to get $\overline{P}$ the corresponding point $\nabla$ on $\nabla$, redefining $\overline{\nabla}$:

$$\overline{\nabla} = \bigcup_{k=1}^{11} \bigcup_{i=1}^{N_k} \bigcup_{j=1}^{\overline{Q}_{k,i}} \{c_i^k + r_i^k d_{k,i}^j\} \quad (4)$$

$$\overline{P} = \bigcup_{k=1}^{11} \bigcup_{i=1}^{N_k} \bigcup_{j=1}^{\overline{Q}_{k,i}} \overline{p}_{k,i}^j.$$

After the correspondence between $\overline{P}$ and $\overline{\nabla}$ is established, the movement of human body as a series of simultaneous and slow movements of all body component. Therefore, the matching and optimization of the model and point cloud convert a global translation t and a series of local rotation. Cost function is formula (5):

$$\min_{R_k, t} \sum_{k=1}^{11} (\lambda \Psi_{corr}(R_k, t) + \Psi_{joint}(R_k, t) + \mu_k \Psi_{regn}(R_k)) \quad (5)$$

$$\text{s.t.} (R_k)^\top R_k = I$$

Where $\lambda$, $\mu_k < 0$ and are weight parameters, the first term $\Psi_{corr}$ penalizes the distance between model surface point and input depth point cloud, $$\Psi_{corr}(R_k, t) = \sum_{i=1}^{N_k} \sum_{j=1}^{\overline{Q}_{k,i}} \left\| \underbrace{c_{parent}^k + R_k(c_i^k - c_{parent}^k + r_{k,i} d_{k,i}^j) + t}_{\text{points of VHM after rotation and translation}} - \overline{p}_{k,i}^j \right\|^2$$

Where $c_{parent}^k$ represents the center coordinate of the parent node of kth component. Based on this constraint, each point of the model is enforced to locate closer to the corresponding point cloud after rotation and translation.

The second term $\Psi_{joint}$ is formula (6), using the joint position information and position direction information of the previous frame, it is used as a special marker information to restrict the excessive space movement and position rotation between the two frames, and to reduce the difference between the two frames to a certain extent $$\Psi_{joint}(R_k, t) = \sum_{m=1}^{M_k} (\alpha_{k,m} \|j_{k,m} - j_{k,m}^{init}\|^2 + \beta_{k,m} \|R_k n_{k,m} - n_{k,m}^{init}\|^2) \quad (6)$$

Where $j_{k,m}$, $j_{k,m}^{init}$ represent the position of the mth join of the kth component under current pose and initial pose, respectively. $n_{k,m}$, $n_{k,m}^{init}$ represent the position of the mth joint and its parent joint under current pose and initial pose, respectively. The weight $\alpha_{k,m}$, $\beta_{k,m}$ for balancing the correspondence term and location is formula (7):

$$\alpha_{k,m} = \frac{\tau^k}{1 + e^{-(\|j_{k,m} - j_{k,m}^{init}\| - \omega_2)}} \quad (7)$$

$$\beta_{k,m} = \frac{\gamma^k}{1 + e^{-(\arccos(n_{k,m}^\top n_{k,m}^{init}) - \omega_2)}}$$

Where $\omega_2$, $\omega_3 > 0$, and are weight parameters for controlling the range of error. $\tau^k$, $\gamma^k$ are scaling parameters which defined by:

$$\tau^k = \frac{\mu_1}{1 + e^{(Dist(\overline{P}^k, \overline{\nabla}^k) - \omega_2)}} \quad (8)$$

$$\gamma^k = \frac{\mu_2}{1 + e^{(Dist(\overline{P}^k, \overline{\nabla}^k) - \omega_2)}}$$

$$Dist(\overline{P}^k, \overline{\nabla}^k) = \frac{1}{|\overline{P}^k|} \sum_{k=1}^{11} \sum_{i=1}^{N_k} \sum_{j=1}^{Q_{k,i}} \|c_i^k + r_i^k d_{k,i}^j - \overline{p}_{k,i}^j\|$$

Where $Dist(\overline{P}^k, \nabla^k)$ represents the average distance between corresponding points of $\overline{P}^k$, $\nabla^k$. $\omega_1 > 0$ is used to determine the distance error threshold. $\tau^k$, $\gamma^k$ are only solved before optimization and after the first corresponding relationship is determined, and remains unchanged in the iterative process, $\alpha_{k,m}$, $\beta_{k,m}$ update when updating correspondence.

The third term $\Psi_{regu}$ is formula (9). The large rotation of each part in the iterative process is constrained. The motion between two adjacent frames is regarded as the process of simultaneous change of each part $$\Psi_{regu}(R_k)=\|R_k-I\|^2 \quad (9).$$

3. Recovering for Pose Tracking Error Based on Dynamic Database Retrieval:

Since the invention belongs to the unsupervised attitude estimation method, the attitude recovery operation is required when the tracking error occurs. Using the overlap rate $\theta_{overlap}$ and cost function value $\theta_{cost}$ of the input depth point cloud and the constructed human body model on the two-dimensional plane to determine whether the current tracking fails. Assuming that human limb motion segments have the repetitive characteristics in time series, therefore, an attitude tracking recovery method based on small dynamic database is proposed. The direction information of each body part is used to represent human three-dimensional motion, as shown as FIG. 3, the upper and lower trunk parts are simplified into two mutually perpendicular main directions, each part of the limbs is represented by a direction vector, and the direction of the head is ignored, which is expressed as a formula (10)

$$v=(v_1^\tau, \ldots, v_{10}^\tau)^\tau \quad (10)$$

Where $v_1$, $v_2$ correspond to the pairwise perpendicular unit directions of upper torso, lower torso, respectively, and $v_3$, $v_{10}$ correspond to the unit direction of all components except upper torso, lower torso, head.

Figures 3, 4:
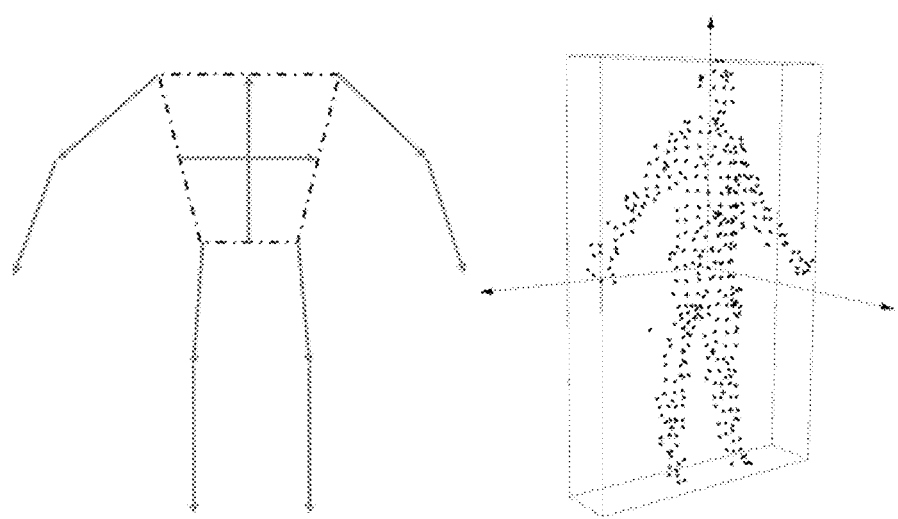
FIG. 3 shows the representation of human body direction characteristic.
FIG. 4 shows the minimum bounding box construction based on Principal Component Analysis (PCA) main direction.

As shown as FIG. 4, PCA is used to extract the main direction $[e_1, e_2, e_3]$ of the depth point cloud, and the minimum bounding box [w,d,h] of the main direction is used to represent the characteristics of the depth point cloud, which is formula (11):

$$e=(we_1^\tau, de_1^\tau, he_3^\tau)\pi \quad (11)$$

If the cost function of matching is less than the threshold value in the tracking process $\theta_{overlap} \leq \theta_1$ and $\theta_{cost} \leq \theta_2$, the tracking is successful and update the database model D by extracting feature s [e, v] The extracted characteristics [e, v] are saved in database as a pair of characteristic vectors. When the tracking fails, the Euclidean distance is calculated by using the characteristics e of the corresponding depth point cloud in the database, the first five positions $\{[e^{(i)}, v^{(i)}]\}_{i=1}^5$ with the smallest distance are found in the database, and the position with the highest overlap rate with the current input depth point cloud is retrieved by using $v^{(i)}$, i=1, ..., 5 to recover the visible spherical distribution constraint point cloud manikin, so as to facilitate the recovery from the tracking failure.

Figure 5:
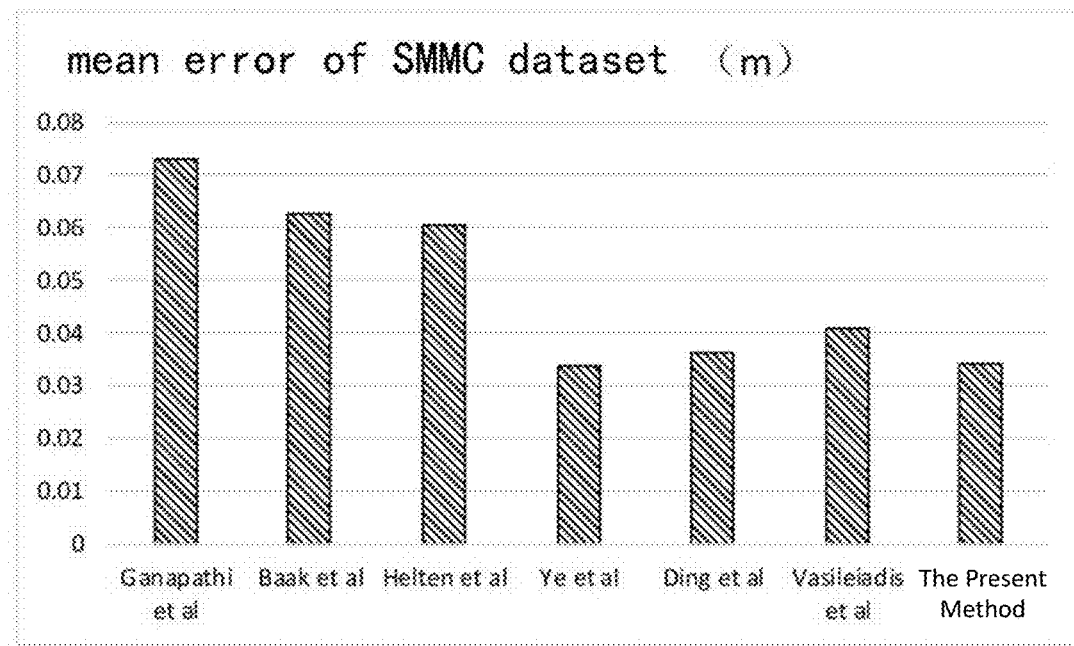
FIG. 5 shows the average error of the Stanford Markerless Motion Capture (SMMC) dataset.
Figure 6:
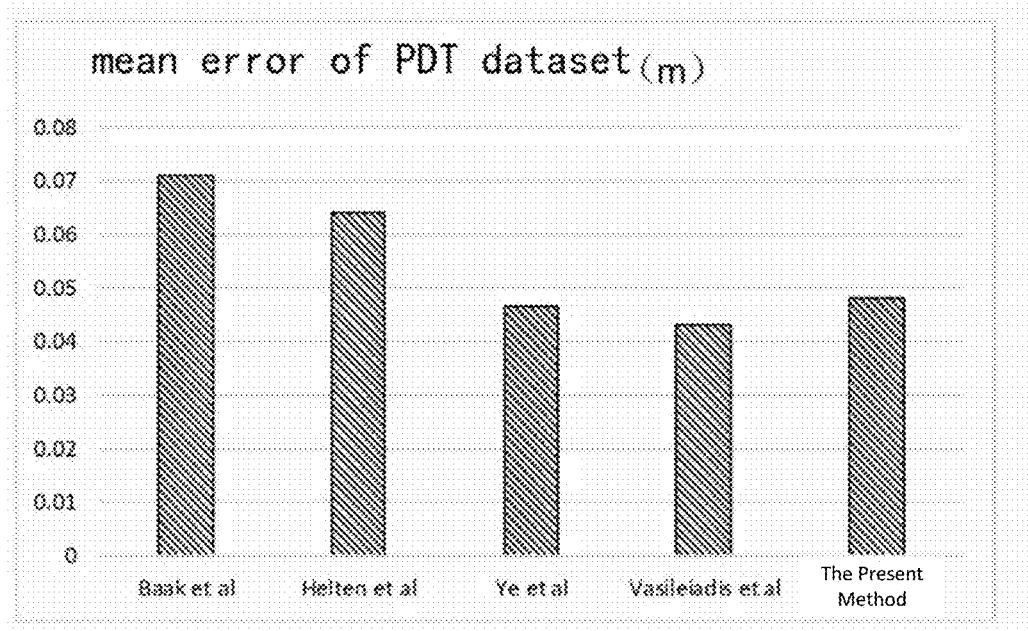
FIG. 6 shows the Personalized Depth Tracker (PDT) dataset mean error.
Figure 7:
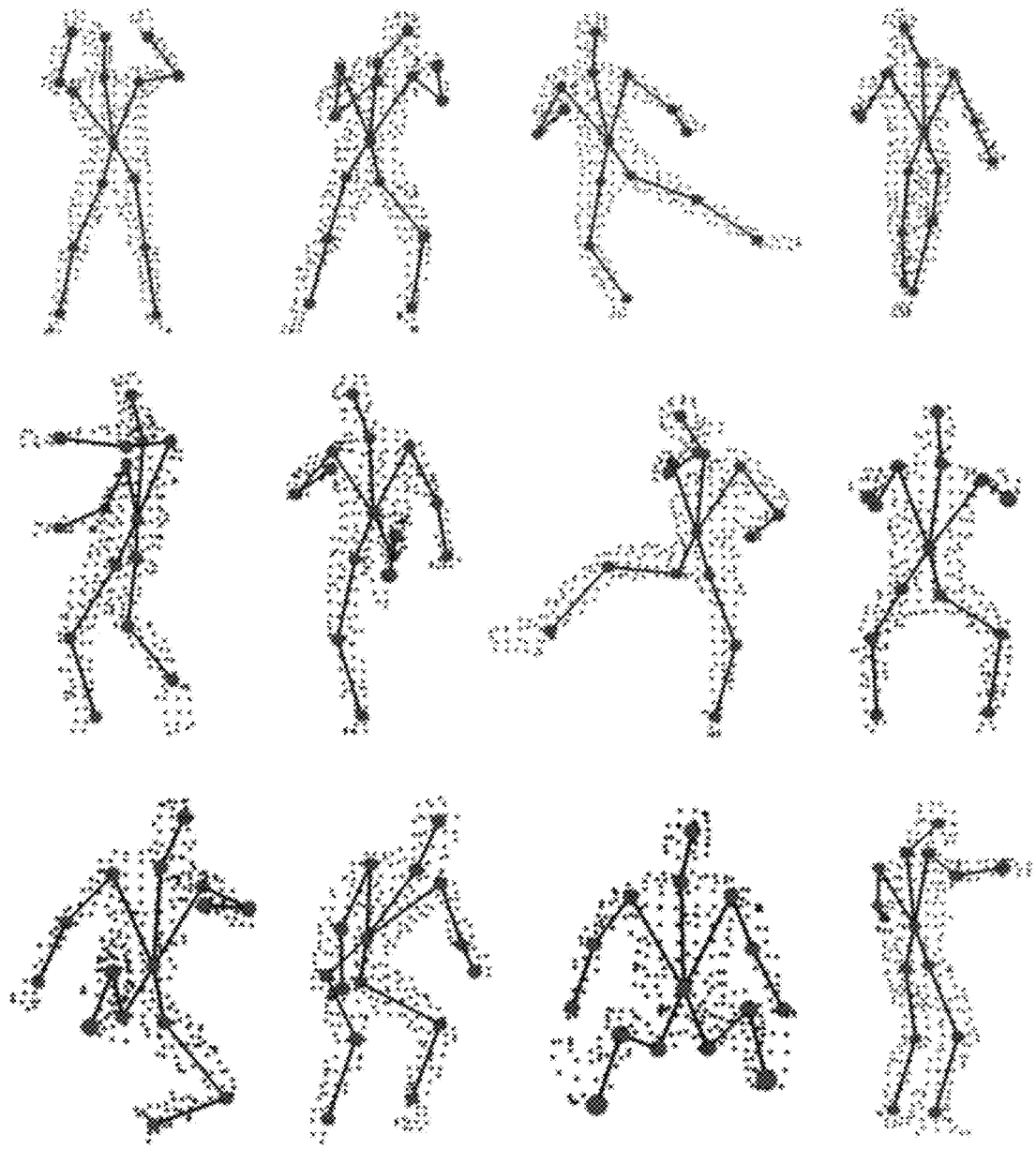
FIG. 7 shows the subjective effect on the PDT database.

The invention has been verified on the open data set SMMC and PDT data set, and good experimental results have been obtained. FIG. 5 shows the average error of the invention on the SINEW data set. The SMMC data set is relatively simple in operation. It can be seen that the present method is equivalent to the result of the best method at present. FIG. 6 shows the average error of the PDT data set of the invention. The action of the PDT data set is complex and challenging, but the method of the invention can also achieve good results. Table 1 shows the efficiency comparison between PDT and SMMC database and other similar methods. Compared with other methods, the average speed of the invention can achieve real-time without GPU acceleration. FIG. 7 shows the subjective effects of some complex postures on the PDT dataset, and the experimental results show that the algorithm can still achieve better estimation results in complex actions.

TABLE 1

| algorithm | real-time (Y/N) | GPU (Y/N) |
|---|---|---|
| Ding&Fan | N | N |
| Ye&Yang | Y | Y |
| Vasileiadis et al | Y | Y |
| The invention | Y | N |

The algorithm Ding and Fan and the Ding SW/IC dataset are implemented from DING et al. "Articulated Gaussian Kernel Correlation for Human Pose Estimation" in Proceedings of the IEEE Conference on Computer Vision and Pattern Recognition Workshops, 2015, pp. 57-64.

The algorithm Ye and Yang, and the dataset (SMMC and PDT) are implemented from YE at al. "Accurate 3D pose estimation from a single depth image" in Proceedings of the IEEE International Conference on Computer Vision, 2011, pp. 731-738.

The algorithm Vasileiadis, and the dataset (SMMC and PDT) are implemented from VASILEIADIS et al. "Robust Human Pose Tracking for Realistic Service Robot Applications" in Proceedings of the IEEE International Conference on Computer Vision Workshops, 2017, pp. 1363-1372.

The SMMC dataset Ganapathi et al. is implemented from GANAPATHI et al. "Real Time Motion Capture Using a Single Time-Of-Flight Camera" in Proceedings of the IEEE Conference on Computer Vision and Pattern Recognition, 2010, pp. 755-762.

The SMMC and PDT dataset Baal et al. is implemented from "A Data-Driven Approach for Real-Time Full Body Pose Reconstruction from a Depth Camera" in Proceedings of the IEEE International Conference on Computer Vision, 2011, pp. 1092-1099.

The SMMC and PDT dataset Helten et al. is implemented from HELTEN et al. "Real-Time Body Tracking with One Depth Camera and Inertial Sensors" in Proceedings of the IEEE International Conference on Computer Vision, 2013, pp. 1105-1112

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What s claimed is:

1. A method for three-dimensional human pose estimation, comprising the following steps:
   (1) establishing a three-dimensional human body model matching an object, wherein the three-dimensional human body model is a cloud point human body model of visible spherical distribution constraint;
   (2) matching and optimizing between the cloud point human body model of visible spherical distribution constraint and a depth point cloud for human body pose tracking; and
   (3) recovering a visible spherical distribution constraint point cloud manikin for pose tracking error based on dynamic database retrieval;
   wherein in step (1):
   representing a human body surface with 57 spheres, wherein each of the 57 spheres is characterized by a respective radius and a respective center, and the respective radius and the respective center are initialized empirically;
   corresponding all of the 57 spheres to 11 body components to define a sphere set S to be a collection of 11 component sphere set models, wherein each of the 11 component sphere set models represents a body component and is defined by formula (1):

$$S = \bigcup_{k=1}^{11} S^k \qquad (1)$$

$$S^k = \{g_i^k\}_{i=1}^{N_k} := \{[c_i^k, r_i^k]\}_{i=1}^{N_k}$$

wherein $\cup$ represents an operation of set union, $g_i^k$ represents an ith sphere of a kth body component, $c_i^k$, $r_i^k$ represent the respective center and the respective radius of the ith sphere in the kth body component, respectively, and $N_k$ represents a number of the spheres contained in the kth body component, with $$\sum_{k=1}^{11} N_k = 57.$$

2. The method for the three-dimensional human pose estimation according to claim 1, wherein in step (1), wrist and ankle movements are ignored.

3. The method for the three-dimensional human pose estimation according to the claim 2, wherein in step (1), for all of the 57 spheres, constructing a directed tree,
wherein each node of the directed tree corresponds to a respective sphere, a root of the directed tree is $g_1^1$, and each node has a unique parent node denoted by a black sphere, wherein a definition of the unique parent node is given by:

parent($S^1$)=$g_1^1$,parent($S^2$)=$g_1^1$,parent($S^3$)=$g_3^2$,parent ($S^4$)=$g_1^3$,parent($S^5$)=$g_1^2$,parent($S^6$)=$g_1^5$,parent ($S^7$)=$g_2^2$,parent($S^8$)=$g_3^1$,parent($S^9$)=$g_1^8$,parent ($S^{10}$)=$g_2^1$,parent($S^{11}$)=$g_1^{10}$ (2)

wherein a motion of each body component is determined by a rotation motion $R_k$ in a local coordinate system with corresponding parent node as an origin plus a global translation vector t in a world coordinate system;
using a Fibonacci spherical algorithm to get spherical point cloud by dense sampling, wherein the cloud point human body model of visible spherical distribution constraint is as shown in formula (3):

$$V = \bigcup_{k=1}^{11} V^k := \bigcup_{k=1}^{11} \bigcup_{i=1}^{N_k} \bigcup_{j=1}^{Q_{k,i}} \{c_i^k + r_i^k d_{k,i}^j\} \qquad (3)$$

$$d_{k,i}^j = [x_{k,i}^j, y_{k,i}^j, z_{k,i}^j]^T$$

$$x_{k,i}^j = \sqrt{1-(z_{k,i}^j)^2} \cdot \cos(2\pi j \phi)$$

$$y_{k,i}^j = \sqrt{1-(z_{k,i}^j)^2} \cdot \sin(2\pi j \phi)$$

$$z_{k,i}^j = (2j-1)/N_i - 1$$

wherein $\cup$ represents the operation of set union, V represents a spherical point set with visibility attributes, $Q_{k,i}$ denotes a number of sampling points of the ith sphere of the kth body component, and $\phi \approx 0.618$ is a golden section ratio, $d_{k,i}^j$ denotes a direction vector of a jth sampling point of the ith sphere of the kth body component;
each point is assigned a visibility attribute, wherein the visibility attribute is determined by an observation coordinate system of the depth point cloud, and whether each point is visible through visibility detection; and a point set consisting of all spherical visible points is used to represent the cloud point human body model of visible spherical distribution constraint.

4. The method for the three-dimensional human pose estimation according to claim 3, wherein in step (2), the depth point cloud P transformed from the depth map is sampled to obtain $\overline{P}$;
wherein assuming that both the cloud point human body model of visible spherical distribution constraint and the depth point cloud are in a same camera coordinate system, a camera corresponding to the depth point cloud is used to constrain an angle of view, and an intersecting part and an occluding part are removed to retain the spherical visible points $\overline{V}$ on the cloud point human body model of visible spherical distribution constraint under a current angle of view; and the spherical visible points represent the cloud point human body model of visible spherical distribution constraint in a current pose;
using Euclidean distance measured to get the $\overline{P}$ and corresponding spherical visible points $\overline{\nabla}$ on the $\overline{V}$, redefining the $\overline{\nabla}$ as follows:

$$\overline{\nabla} = \bigcup_{k=1}^{11} \bigcup_{i=1}^{N_k} \bigcup_{j=1}^{\overline{Q}_{k,i}} \{c_i^k + r_i^k d_{k,i}^j\} \qquad (4)$$

$$\overline{\mathcal{P}} = \bigcup_{k=1}^{11} \bigcup_{i=1}^{N_k} \bigcup_{j=1}^{\overline{Q}_{k,i}} \overline{p}_{k,i}^j.$$

wherein
$\cup$ represents the operation of set union,
the $\overline{\nabla}$ represents the corresponding spherical visible point set obtained after the spherical visible points $\overline{V}$ are matched with the depth point cloud P through Euclidean distance to establish a correspondence with the depth point cloud P,
the $\overline{P}$ is a point set obtained after the depth point cloud P is sampled to establish the correspondence with the $\overline{\nabla}$;
$\overline{Q}_{k,i}$ represents a number of points of the ith sphere in the kth body component in the $\overline{P}$, and
$\overline{p}_{k,i}^j$ represents each point in $\overline{Q}_{k,i}$ and the jth point of the ith sphere in the kth body component.

5. The method for the three-dimensional human pose estimation according to claim 4, wherein in step (2),
after the correspondence between $\overline{P}$ and $\overline{\nabla}$ is established, a movement of human body is a series of simultaneous and slow movements of all body component; the matching and optimizing of the cloud point model of visible spherical distribution constraint and the depth point cloud convert a global translation t and a series of local rotation; a cost function is shown in formula (5):

$$\min_{R_k, t} \sum_{k=1}^{11} (\lambda \Psi_{corr}(R_k, t) + \Psi_{joint}(R_k, t) + \mu_k \Psi_{regu}(R_k)) \qquad (5)$$

-continued $$s.t. (R_k)^\top R_k = I$$

wherein $\lambda$ and $\mu_k$ are larger than 0 and are weight parameters, I represents an identity matrix;

a first term $\Psi_{corr}$ penalizes a distance between a model surface point and the depth point cloud, $$\Psi_{corr}(R_k, t) = \sum_{i=1}^{N_k} \sum_{j=1}^{\overline{Q}_{k,i}} \underbrace{\left\| c_{parent}^k + R_k(c_i^k - c_{parent}^k + r_{k,i}d_{k,i}^j) + t - \overline{p}_{k,i}^j \right\|^2}_{\text{points of VHM after rotation and translation}}$$

wherein $c_{parent}^k$ represents a center coordinate of the unique parent node of the kth component; VHM represents a visible hybrid model composed of the each of the 11 component sphere set models as shown in formula 1 and the cloud point human body model of visible spherical distribution constraint as shown in formula 3; based on a constraint of the first term $\Psi_{corr}$, each point of the cloud point human body model of visible spherical distribution constraint is enforced to locate closer to the corresponding point cloud after rotation and translation;

a second term $\Psi_{joint}$ is shown in formula (6), using joint position information and position direction information of a previous frame, the second term $\Psi_{joint}$ is used as a special marker information to restrict an excessive space movement and position rotation between two frames, and to reduce a difference between the two frames;

$$\Psi_{joint}(R_k,t) = \sum_{m=1}^{M_k}(\alpha_{k,m}\|j_{k,m}+t-j_{k,m}^{init}\|^2 + \beta_{k,m}\|R_k n_{k,m} - n_{k,m}^{init}\|^2) \quad (6)$$

wherein $M_k$ represents a number of joint points included in the kth body component, $j_{k,m}$ and $j_{k,m}^{init}$ represents a position of a mth joint of the kth body component under the current pose and an initial pose, respectively; $n_{k,m}$ and $n_{k,m}^{init}$ represent a position of the mth joint and corresponding parent joint under the current pose and the initial pose, respectively; $\alpha_{k,m}$ and $\beta_{k,m}$ are weights for balancing correspondence term and location and are defined by formula (7):

$$\alpha_{k,m} = \frac{\tau^k}{1 + e^{-(\|j_{k,m} - j_{k,m}^{init}\| - \omega_2)}} \quad (7)$$

$$\beta_{k,m} = \frac{\gamma^k}{1 + e^{-(arccos(n_{k,m}^\top n_{k,m}^{init}) - \omega_2)}}$$

wherein $\omega_2$, $\omega_3 > 0$, and are weight parameters for controlling a range of error; $\tau^k$ and $\gamma^k$ are scaling parameters defined by:

$$\tau^k = \frac{\mu_1}{1 + e^{(Dist(\overline{p}^k,\overline{v}^k) - \omega_2)}} \quad (8)$$

$$\gamma^k = \frac{\mu_2}{1 + e^{(Dist(\overline{p}^k,\overline{v}^k) - \omega_2)}}$$

$$Dist(\overline{p}^k,\overline{v}^k) = \frac{1}{|\overline{p}^k|}\sum_{k=1}^{11}\sum_{i=1}^{N_k}\sum_{j=1}^{Q_{k,i}}\|c_i^k + r_i^k d_{k,i}^j - \overline{p}_{k,i}^j\|$$

wherein $Dist(\overline{P}^k, \overline{V}^k)$ represents an average distance between corresponding points of $\overline{P}^k$, $\overline{V}^k$; $\omega_1 > 0$ is used to determine a distance error threshold; $\tau^k$ and $\gamma^k$ are only solved before the optimizing and after a first corresponding relationship is determined, and remain unchanged in step (2); $\alpha_{k,m}$ and $\beta_{k,m}$ are updated when updating correspondence;

a third term $\Psi_{regu}$ is defined by formula (9), wherein a large rotation of each body component in the iterative process is constrained; a motion between the two frames is regarded as a process of simultaneous change of each body component, $$\Psi_{regu}(R_k) = \|R_k - I\|^2 \quad (9).$$

6. The method for the three-dimensional human pose estimation according to claim 5, wherein in step (3), using an overlap rate $\theta_{overlap}$ and a cost function value $\theta_{cost}$ of the depth point cloud and the cloud point human body model of visible spherical distribution constraint on a two-dimensional plane to determine whether a current tracking fails;

assuming that human limb motion segments have repetitive characteristics in time series, direction information of each body component is used to represent a human three-dimensional motion, upper and lower trunk parts are simplified into two mutually perpendicular main directions, each part of limbs is represented by a direction vector v, and the direction of a head is ignored, wherein the direction information of each bod component is expressed as formula (10):

$$v = (v_1^\tau, \ldots, v_{10}^\tau)^\tau \quad (10)$$

wherein $v_1$, $v_2$ correspond to pairwise perpendicular unit directions of upper torso and lower torso, respectively, and $v_3, \ldots, v_{10}$ correspond to a unit direction of all body components except the upper torso, the lower torso, and the head.

7. The method for the three-dimensional human pose estimation according to claim 6, wherein in step (3), Principal Component Analysis (PCA) is used to extract a main direction $[e_1, e_2, e_3]$ of the depth point cloud, and a minimum bounding box [w,d,h] of the main direction is used to represent characteristics of the depth point cloud, wherein the characteristics of the depth point cloud are defined by formula (11):

$$e = (we_1^\tau, de_1^\tau, he_3^\tau)^\tau \quad (11);$$

wherein if the cost function of the matching is less than a threshold value in the tracking process $\theta_{overlap} \leq \theta_1$ and $\theta_{cost} \leq \theta_2$, the tracking is successful, and updating a database model V by extracting characteristics [e, v], wherein the extracted characteristics [e, v] are saved in a database as a pair of characteristic vectors;

if the tracking fails, the Euclidean distance is calculated by using the characteristics e of the corresponding depth point cloud in the database, first five positions $\{[e^{(i)}, v^{(i)}]\}_{i=1}^5$ with a smallest distance are found in the database, and a position with a highest overlap rate with the depth point cloud is retrieved by using $v^{(i)}$, i=1, . . . , 5 to recover the visible spherical distribution constraint point cloud manikin, so as to facilitate a recovery from a tracking failure.

* * * * *